(12) United States Patent
Heason

(10) Patent No.: US 10,683,775 B2
(45) Date of Patent: Jun. 16, 2020

(54) GAS SHIELDING ARRANGEMENTS FOR GAS TURBINE ENGINES

(71) Applicant: ROLLS-ROYCE plc, London (GB)

(72) Inventor: Christopher P Heason, Chesterfield (GB)

(73) Assignee: ROLLS-ROYCE plc, London (GB)

(*) Notice: Subject to any disclaimer, the term of this patent is extended or adjusted under 35 U.S.C. 154(b) by 302 days.

(21) Appl. No.: 15/671,813

(22) Filed: Aug. 8, 2017

(65) Prior Publication Data

US 2018/0066544 A1 Mar. 8, 2018

(30) Foreign Application Priority Data

Sep. 7, 2016 (GB) .................................. 1615149.0

(51) Int. Cl.
| | | |
|---|---|---|
| *F01D 25/28* | (2006.01) | |
| *F01D 5/00* | (2006.01) | |
| *F02C 7/00* | (2006.01) | |
| *F02C 7/055* | (2006.01) | |

(52) U.S. Cl.
CPC ............ *F01D 25/285* (2013.01); *F01D 5/005* (2013.01); *F02C 7/00* (2013.01); *F02C 7/055* (2013.01); *F05D 2230/232* (2013.01); *F05D 2230/72* (2013.01); *F05D 2230/80* (2013.01); *F05D 2260/02* (2013.01)

(58) Field of Classification Search
CPC ........ F01D 25/002; F01D 5/005; B64F 1/005; B60J 11/00; B23P 6/002; B23P 6/007; B23P 6/045; B23K 20/14; F05D 2230/80; F05D 2230/232; F05D 2230/235; F05D 2230/237

USPC ........................................................... 219/72
See application file for complete search history.

(56) References Cited

U.S. PATENT DOCUMENTS 6,010,746 A * 1/2000 Descoteaux ......... B23K 20/002
427/142
6,049,979 A * 4/2000 Nolan .................. B23K 9/0026
29/889.1

(Continued)

FOREIGN PATENT DOCUMENTS

| EP | 0934795 A2 | 8/1999 |
| EP | 2 522 816 A2 | 11/2012 |

(Continued)

OTHER PUBLICATIONS

Jan. 18, 2018 Search Report issued in European Patent Application No. 17185239.

(Continued)

*Primary Examiner* — Todd E Manahan
*Assistant Examiner* — David P. Olynick
(74) *Attorney, Agent, or Firm* — Oliff PLC

(57) ABSTRACT

A gas shield arrangement for a gas turbine engine includes a first gas shield that is arranged to cover an inlet of a gas flow path of the gas turbine engine and a second gas shield that is arranged to cover a first outlet of the gas flow path of the gas turbine engine. The gas shield arrangement further includes a reservoir that holds fluid and a pump that pumps the fluid from the reservoir to one of a first valve and a second valve and that returns at least some of the pumped fluid to the reservoir from the other of the first valve and the second valve.

16 Claims, 5 Drawing Sheets

(56) References Cited

U.S. PATENT DOCUMENTS

| | | | |
|---|---|---|---|
| 7,137,544 B2* | 11/2006 | Caddell, Jr. | B23K 9/16 |
| | | | 228/9 |
| 8,563,080 B2* | 10/2013 | Hopkins | C23C 4/06 |
| | | | 427/140 |
| 9,341,300 B2 | 5/2016 | Hacikyan | |
| 2003/0127493 A1 | 7/2003 | Ciriza | |
| 2004/0118341 A1 | 6/2004 | Kunder et al. | |
| 2006/0062911 A1 | 3/2006 | Medford et al. | |
| 2009/0026173 A1* | 1/2009 | Arnett | B08B 15/02 |
| | | | 219/74 |
| 2010/0251961 A1* | 10/2010 | Bishop | B23K 9/162 |
| | | | 118/58 |
| 2010/0270270 A1* | 10/2010 | Bishop | B23K 9/291 |
| | | | 219/74 |
| 2012/0308462 A1* | 12/2012 | Grant | B01D 53/04 |
| | | | 423/262 |
| 2013/0263737 A1* | 10/2013 | Lee | B01D 46/42 |
| | | | 95/279 |
| 2017/0218763 A1* | 8/2017 | Diwinsky | F01D 5/005 |

FOREIGN PATENT DOCUMENTS

| | | |
|---|---|---|
| JP | S55-112825 A | 9/1980 |
| WO | 2015/045879 A1 | 4/2015 |

OTHER PUBLICATIONS

Feb. 24, 2017 Search Report issued in British Patent Application No. 1615149.0.

* cited by examiner

GAS SHIELDING ARRANGEMENTS FOR GAS TURBINE ENGINES

TECHNOLOGICAL FIELD

The present disclosure concerns gas shielding arrangements for gas turbine engines.

BACKGROUND

Gas turbine engines may sustain wear and/or damage during operation that may reduce the efficiency of the gas turbine engine. Repair of the gas turbine engine may be a relatively time consuming task and may require disassembly of the gas turbine engine. For example, gas turbine engines used in aviation are usually mounted on a wing of an aircraft and a repair process may require the gas turbine engine to be removed from the wing of the aircraft and then disassembled to allow access to the worn and/or damaged component. This repair process may be relatively expensive in terms of cost, working hours and time out of operation for the engine.

BRIEF SUMMARY

According to various examples there is provided a gas shield arrangement for a gas turbine engine, the gas shield arrangement comprising: a first gas shield arranged to cover an inlet of a gas flow path of the gas turbine engine; and a second gas shield arranged to cover a first outlet of the gas flow path of the gas turbine engine.

The first gas shield may have a perimeter that is arranged to couple to the gas turbine engine around the inlet.

The second gas shield may have a perimeter that is arranged to couple to the gas turbine engine around the first outlet.

The first gas shield may comprise a first valve to control a flow of fluid through the first gas shield.

The second gas shield may comprise a second valve to control a flow of fluid through the second gas shield.

The gas shield arrangement may further comprise a third gas shield arranged to cover a second outlet of the gas flow path of the gas turbine engine.

The third gas shield may comprise a third valve to control a flow of fluid through the third gas shield.

The gas shield arrangement may further comprise a fourth valve to control a flow of fluid through a borescope port of the gas turbine engine.

According to various examples there is provided apparatus comprising: a gas shield arrangement as described in any of the preceding paragraphs; and a continuum robot for performing an action within the gas turbine engine.

The action may be welding a component of the gas turbine engine.

According to various examples there is provided a method of gas shielding a gas turbine engine, the method comprising: covering an inlet of a gas flow path of the gas turbine engine using a first gas shield; and covering a first outlet of the gas flow path of the gas turbine engine using a second gas shield.

The first gas shield may have a perimeter that is arranged to couple to the gas turbine engine around the inlet.

The second gas shield may have a perimeter that is arranged to couple to the gas turbine engine around the first outlet.

The first gas shield may comprise a first valve to control a flow of fluid through the first gas shield.

The second gas shield may comprise a second valve to control a flow of fluid through the second gas shield.

The method may further comprise covering a second outlet of the gas flow path of the gas turbine engine using a third gas shield.

The third gas shield may comprise a third valve to control a flow of fluid through the third gas shield.

The method may further comprise providing a fourth valve to control a flow of fluid through a borescope port of the gas turbine engine.

The method may further comprise providing a continuum robot; and performing an action within the gas turbine engine using the continuum robot.

The action may be welding a component of the gas turbine engine.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION

Embodiments will now be described by way of example only, with reference to the Figures, in which.

DETAILED DESCRIPTION

In the following description, the terms 'connected' and 'coupled' mean operationally connected and coupled. It should be appreciated that there may be any number of intervening components between the mentioned features, including no intervening components.

Figure 1:
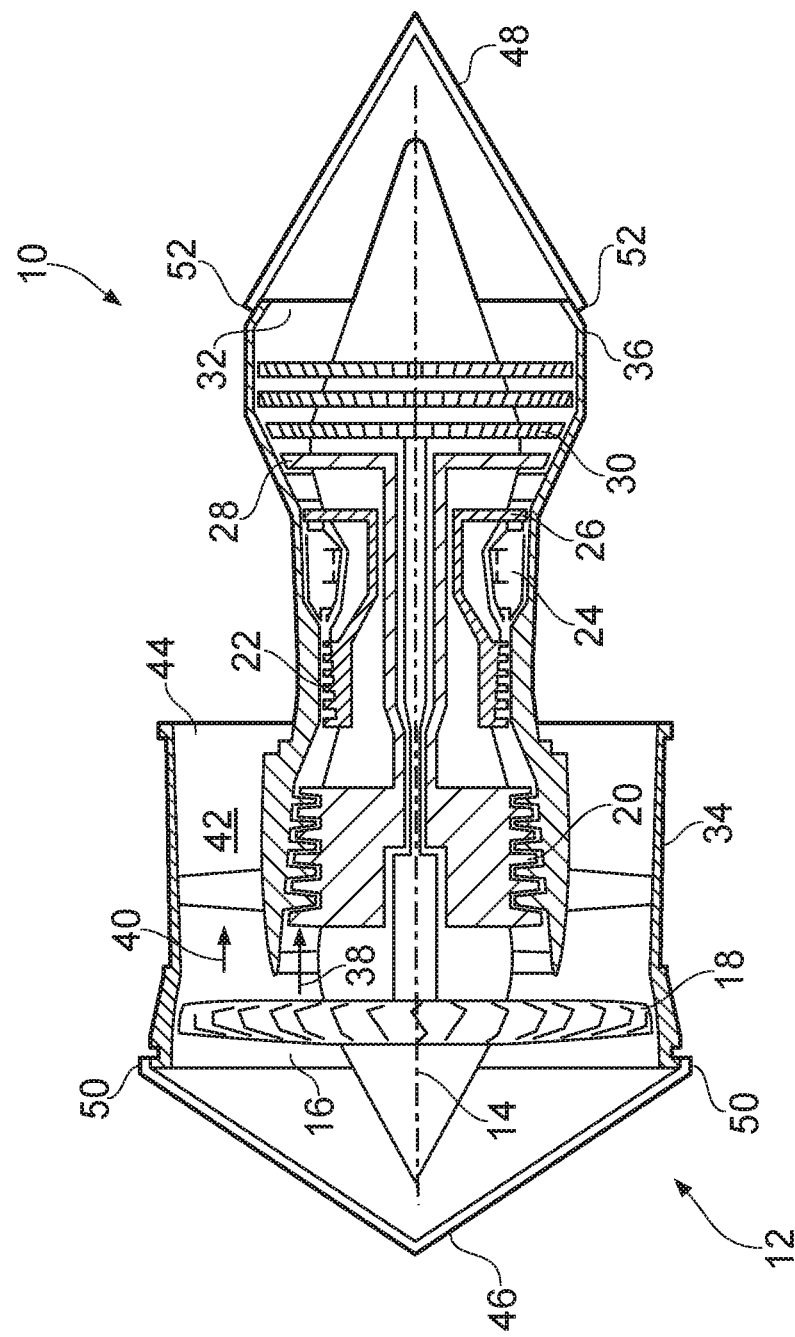
FIG. 1 illustrates a cross sectional side view of a gas turbine engine and a gas shield arrangement according to various examples.

FIG. 1 illustrates a gas turbine engine 10 and a gas shield arrangement 12 according to various examples. The gas turbine engine 10 may be used in any industry and may be, for example, an aerospace gas turbine engine mounted on an aeroplane, a marine gas turbine engine mounted within a vessel, or an industrial gas turbine engine for generating electricity.

The gas turbine engine 10 has a rotational axis 14 and comprises, in axial flow series, an air intake 16, a fan 18, an intermediate pressure compressor 20, a high-pressure compressor 22, combustion equipment 24, a high-pressure turbine 26, an intermediate pressure turbine 28, a low-pressure turbine 30 and an exhaust nozzle 32 (which may be referred to as an outlet). A fan case 34 defines an annulus that houses the fan 18, and an engine case 36 defines an annulus that houses the intermediate pressure compressor 20, the high pressure compressor 22, the combustion equipment 24, the high pressure turbine 26, the intermediate pressure turbine 28, the low pressure turbine 30 and defines the exhaust nozzle 32.

Where the gas turbine engine 10 is an aerospace gas turbine engine, a nacelle (not illustrated in the figures to maintain clarity) generally surrounds the gas turbine engine and is coupled to the fan case 34. The nacelle may include one or more doors for providing access to the fan case 34 and the engine case 36 when the gas turbine engine 10 is mounted on an aircraft.

The gas turbine engine 10 operates so that air entering the intake 16 is accelerated by the fan 18 to produce two gas flow paths: a first gas flow path 38 into the intermediate pressure compressor 20 and a second gas flow path 40 which passes through a bypass duct 42 to provide propulsive thrust. The second gas flow is exhausted from the bypass duct 42 via an outlet 44.

The intermediate pressure compressor 20 compresses the air flow directed into it before delivering that air to the high pressure compressor 22 where further compression takes place. The compressed air exhausted from the high-pressure compressor 22 is directed into the combustion equipment 24 where it is mixed with fuel and the mixture combusted. The resultant hot combustion products then expand through, and thereby drive the high, intermediate and low-pressure turbines 26, 28, 30 before being exhausted through the nozzle 32 to provide additional propulsive thrust. The high pressure turbine 26, the intermediate pressure turbine 28 and the low pressure turbine 30 drive the high pressure compressor 22, the intermediate pressure compressor 20 and the fan 18 respectively, each by an interconnecting shaft.

Other gas turbine engines to which the present disclosure may be applied may have alternative configurations. By way of example, such engines may have an alternative number of interconnecting shafts (e.g. two) and/or an alternative number of compressors and/or turbines. Furthermore, the gas turbine engine may comprise a gearbox provided in the drive train from a turbine to a compressor and/or fan.

In summary, the gas shield arrangement 12 is configured to cover at least some of the openings to the first gas flow path 38 and/or the second gas flow path 40 to prevent the egress of a fluid (such as an inert gas) from the first gas flow path 38 and/or the second gas flow path 40. This may enable an action that benefits from (or requires) a controlled atmosphere (such as a repair activity and/or an inspection activity) to be performed within the first gas flow path 38 and/or the second gas flow path 40.

In more detail, the gas shield arrangement 12 includes a first gas shield 46 and a second gas shield 48.

Figure 2:
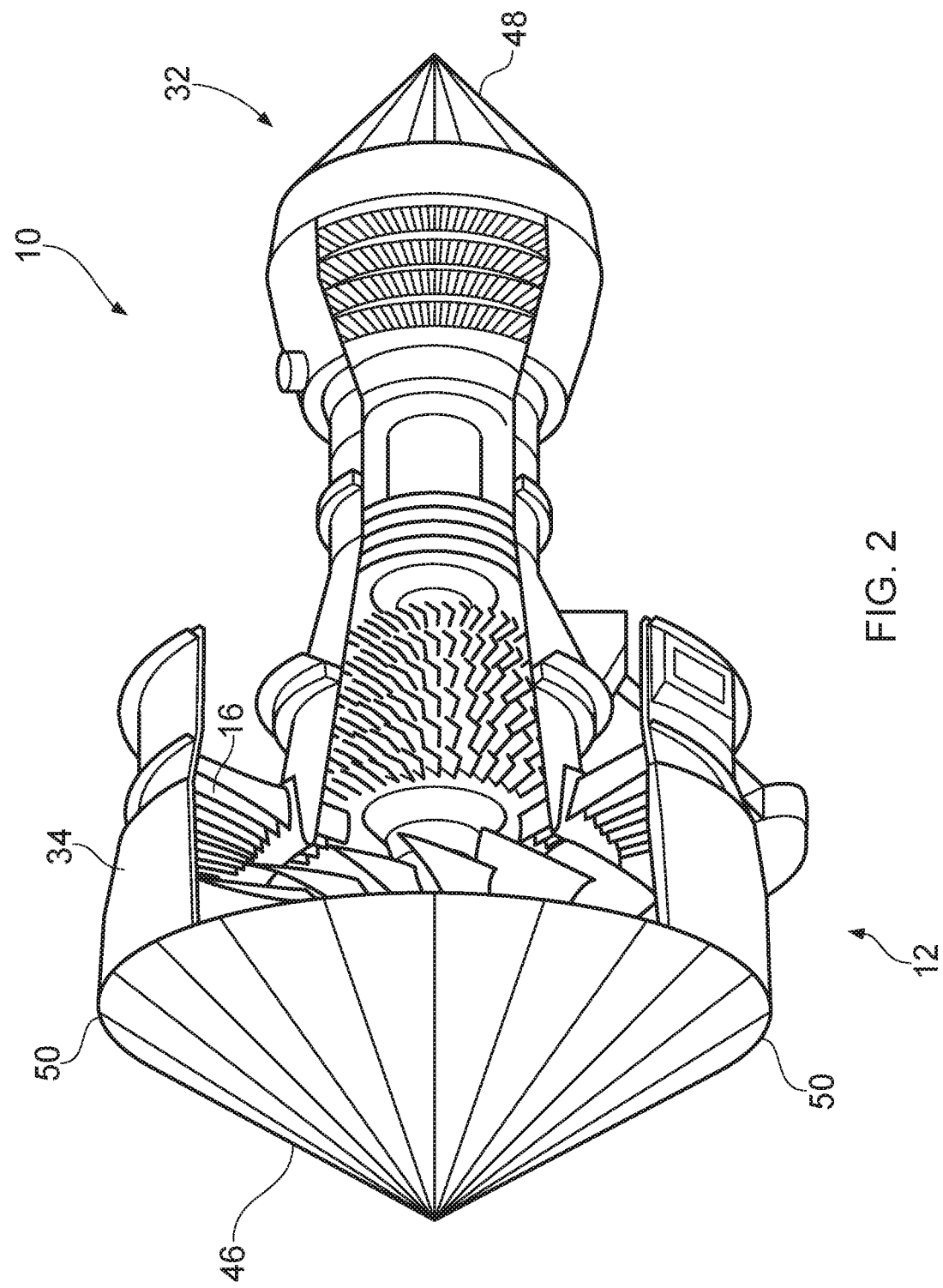
FIG. 2 illustrates a perspective view of the gas turbine engine and the gas shield arrangement illustrated in FIG. 1.

The first gas shield 46 is arranged to cover the inlet 16 of the gas turbine engine 10. The first gas shield 46 may have any suitable shape (for example, a conical shape as illustrated in FIGS. 1 and 2) that defines a perimeter 50 that is arranged to couple to the gas turbine engine 10 around the inlet 16. For example, the perimeter 50 of the first gas shield 46 may be coupled to the fan case 34 adjacent to the inlet 16 via a plurality of fasteners (such as clips or pegs). By way of another example, the perimeter 50 of the first gas shield 46 may comprise an elastic annulus that provides a radially compressive force to the fan case 34 adjacent to the inlet 16. The first gas shield 46 may comprise any suitable impermeable material that prevents the flow of a fluid there through. For example, the first gas shield 46 may comprise rubber, polyvinyl chloride (PVC), polyurethane (PU), silicone elastomer, or fluoropolymer.

The second gas shield 48 is arranged to cover the exhaust nozzle 32 of the gas turbine engine 10. The second gas shield 48 may have any suitable shape (for example, a conical shape as illustrated in FIGS. 1 and 2) that defines a perimeter 52 that is arranged to couple to the gas turbine engine 10 around the exhaust nozzle 32. In some examples, the perimeter 52 of the second gas shield 48 may be coupled to the engine case 36 adjacent to the exhaust nozzle 32 via a plurality of fasteners (such as clips or pegs). By way of another example, the perimeter 52 of the second gas shield 48 may comprise an elastic annulus that provides a radially compressive force to the engine case 36 adjacent to the exhaust nozzle 32. The second gas shield 48 may comprise any suitable impermeable material that prevents the flow of a fluid there through. For example, the second gas shield 48 may comprise rubber, polyvinyl chloride (PVC), polyurethane (PU), silicone elastomer, or fluoropolymer.

Figure 3:
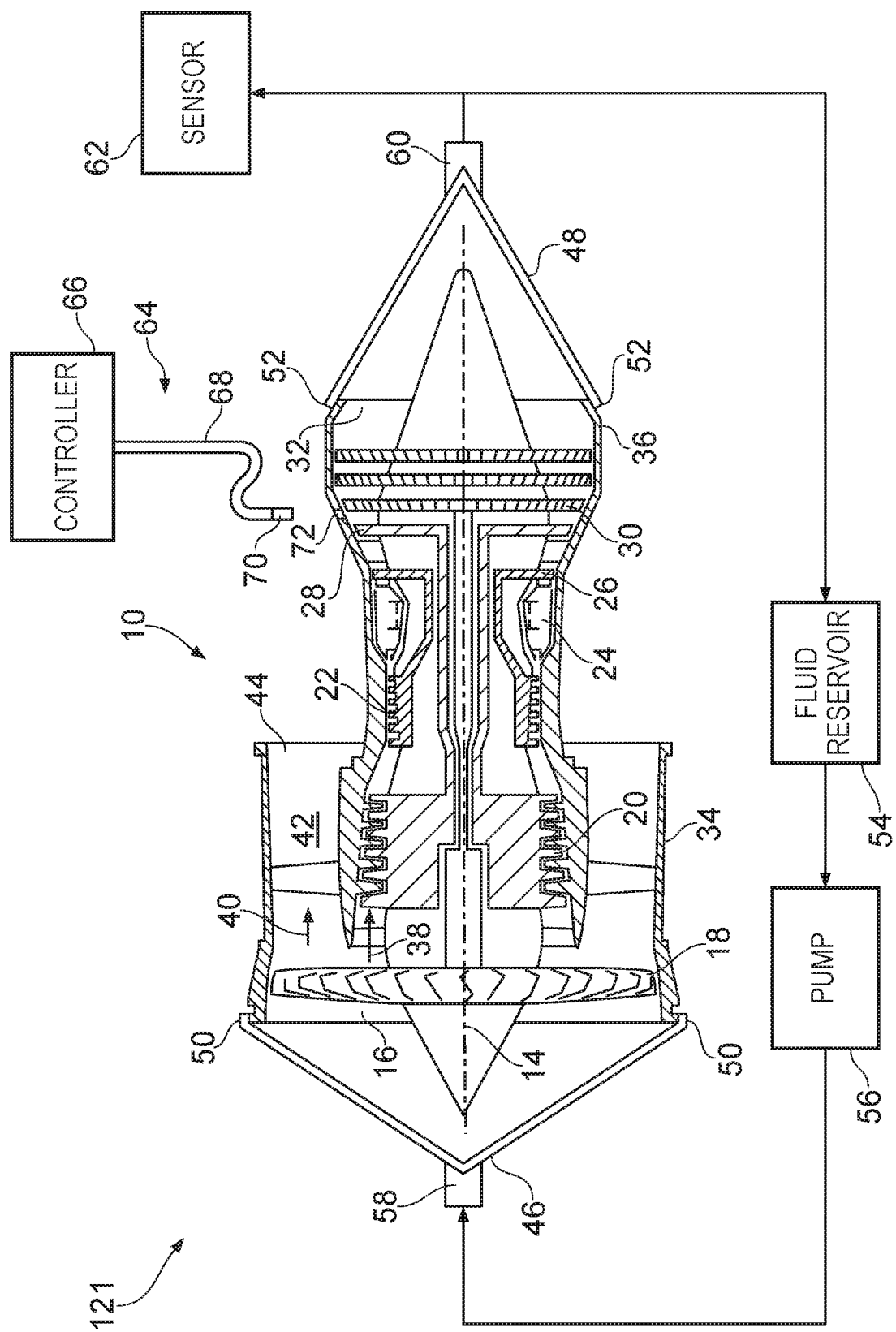
FIG. 3 illustrates a cross sectional side view of the gas turbine engine and another gas shield arrangement according to various examples.

FIG. 3 illustrates a cross sectional view of the gas turbine engine 10 and another gas shield arrangement 121 according to various examples. The gas shield arrangement 121 is similar to the gas shield arrangement 12 illustrated in FIGS. 1 and 2, and where the features are similar, the same reference numerals are used.

The gas shield arrangement 121 differs from the gas shield arrangement 12 in that the gas shield arrangement 121 further comprises a fluid reservoir 54, a pump 56, a first valve 58, a second valve 60, a sensor 62, and a continuum robot 64.

The fluid reservoir 54 may include one or more containers that comprise one or more fluids respectively for enabling one or more actions to be performed within the first gas flow path 38 and/or the second gas flow path 40 of the gas turbine engine 10. For example, the fluid reservoir 54 may comprise one or more inert gases such as argon and/or nitrogen to enable a welding activity to be performed in the first gas flow path 38 and/or the second gas flow path 40.

The pump 56 may comprise any suitable pump or pumps for pumping fluid from the fluid reservoir 54 to the first valve 58. For example, the pump 56 may include one or more centrifugal pumps between the fluid reservoir 54 and the first valve 58 to supply fluid from the fluid reservoir 54 to the first valve 58. In another example, the pump 56 may include one or more axial flow pumps between the fluid reservoir 54 and the first valve 58 to supply fluid from the fluid reservoir 54 to the first valve 58.

The first valve 58 is configured to control a flow of fluid through the first gas shield 46. The first valve 58 may comprise any suitable structure and may be positioned at any location on the first gas shield 46. The first valve 58 is configured to receive fluid from the pump 56 and allow the fluid to flow through the first gas shield 46 and into the first gas flow path 38 and the second gas flow path 40. The first valve 58 is also configured to prevent fluid from flowing in the opposite direction (that is, from the first and second gas flow paths 38, 40, through the fan 18, and into the environment around the gas turbine engine 10).

The second valve 60 is configured to control a flow of fluid through the second gas shield 48. The second valve 60 may comprise any suitable structure and may be positioned at any location on the second gas shield 48. The second valve 60 is configured to receive fluid from the first gas flow path 38 and allow the fluid to flow through the second gas shield 48. The fluid may then return to the fluid reservoir 54 and/or flow to the sensor 62. The second valve 60 is also configured to prevent fluid from flowing in the opposite direction (that is, from the environment outside of the gas turbine engine 10 and into the first gas flow path 38).

It should be appreciated that in other examples, the second valve 60 may be configured to receive fluid from the pump 56 and allow the fluid to flow through the second gas shield 48 to the first gas flow path 38. Similarly, the first valve 58 may be configured to receive fluid from the first gas flow path 38 and allow the fluid to flow through the first gas shield 46 and return to the fluid reservoir 54 and/or flow to the sensor 62.

The sensor 62 may comprise any suitable sensor or sensors for analysing the fluid exhausted from the second valve 60. For example, the sensor 62 may include a chemical sensor that monitors the composition of the gas to check for impurities. The sensor 62 may be configured to exhaust the fluid into the environment outside of the gas turbine engine 10, or may be configured to provide the fluid to the fluid reservoir 54, or may be configured to provide the fluid to a further container (not illustrated) for later waste disposal.

The continuum robot 64 is configured to perform an action within the gas turbine engine 10. For example, the continuum robot 64 may be configured to perform a repair activity and/or an inspection activity within the gas turbine engine 10. The continuum robot 64 may include a controller 66, a snake arm 68, and a tool 70.

The controller 66 may comprise any suitable circuitry to control operation of the snake arm 68 and the tool 70. The controller 66 may comprise: control circuitry; and/or processor circuitry; and/or at least one application specific integrated circuit (ASIC); and/or at least one field programmable gate array (FPGA); and/or single or multi-processor architectures; and/or sequential/parallel architectures; and/or at least one programmable logic controllers (PLCs); and/or at least one microprocessor; and/or at least one microcontroller; and/or a central processing unit (CPU); and/or a graphics processing unit (GPU). In some examples, the controller 66 may include at least one processor and at least one memory. The memory stores a computer program comprising computer readable instructions that, when read by the processor, controls operation of the snake arm 68 and the tool 70.

The snake arm 68 is configured to be inserted into the gas turbine engine 10 via a borescope port 72 in the engine case 36. The snake arm 68 may comprise any suitable structure and may comprise, for example, a plurality of disks connected to one another via a plurality of joints that may be controllably oriented by one or more cables that extend along the length of the snake arm 68 and are connected to one or more servomotors respectively.

The tool 70 is mounted on the snake arm 68 and is also configured to be inserted into the gas turbine engine 10 via the borescope port 72 in the engine case 36. The tool 70 may comprise any device that enables the continuum robot 64 to perform an action (such as a repair activity or an inspection activity) in the gas turbine engine 10. For example, the tool 70 may comprise welding apparatus for repairing the gas turbine engine 10. By way of another example, the tool 70 may comprise an electron beam emitter for performing electron tomography.

It should be appreciated that a plurality of continuum robots 64 may be inserted into the gas turbine engine 10 via a plurality of borescope ports 72 while fluid is pumped through the first gas flow path 38. Furthermore, one or more continuum robots 64 may be inserted into the bypass duct 42 while fluid is pumped through the second gas flow path 40.

Figure 4:
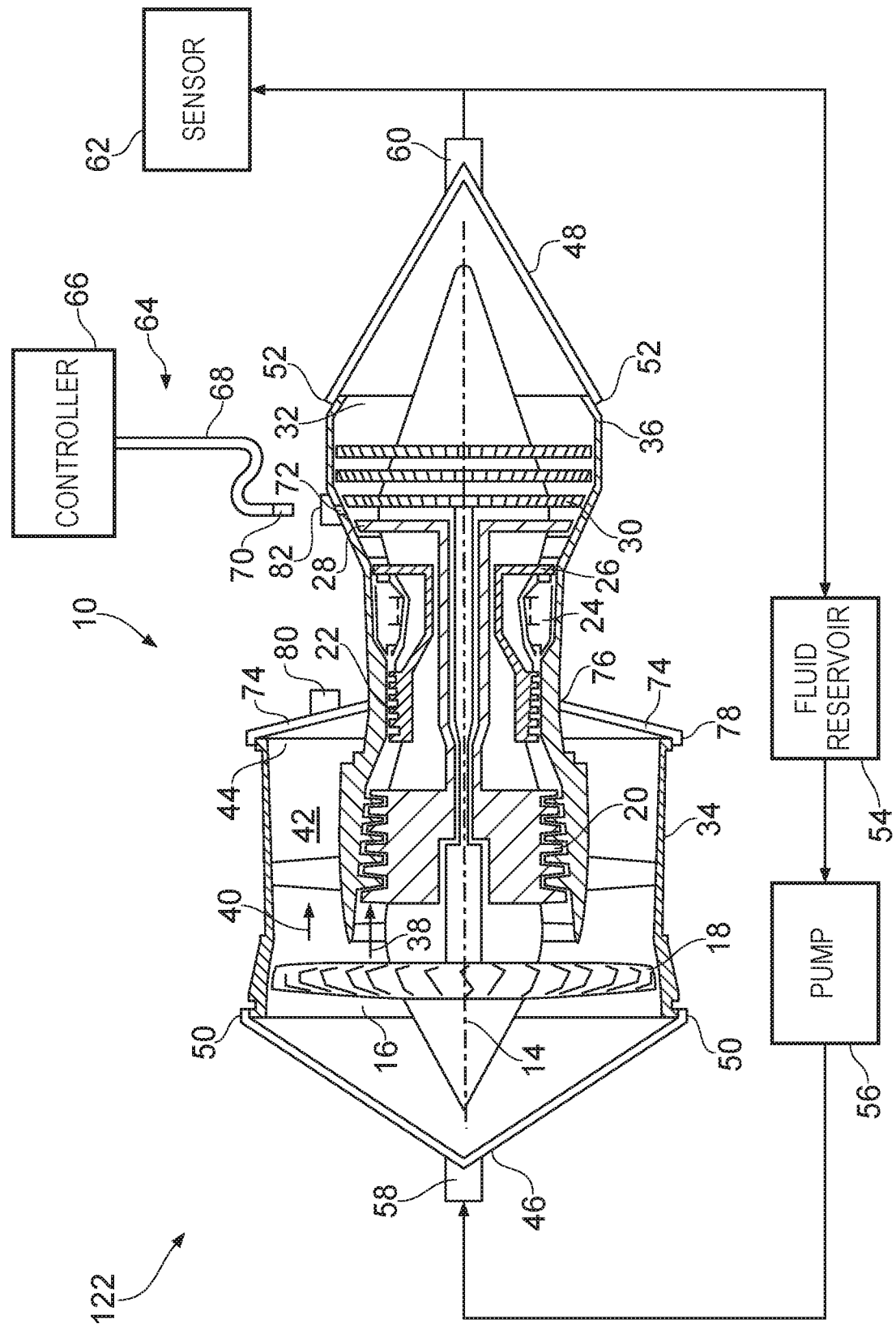
FIG. 4 illustrates a cross sectional side view of the gas turbine engine and a further gas shield arrangement according to various examples.

FIG. 4 illustrates a cross sectional view of the gas turbine engine 10 and a further gas shield arrangement 122 according to various examples. The gas shield arrangement 122 is similar to the gas shield arrangement 121 illustrated in FIG. 3 and where the features are similar, the same reference numerals are used.

The gas shield arrangement 122 differs from the gas shield arrangement 121 in that the gas shield arrangement 122 further comprises a third gas shield 74 that is arranged to cover the outlet 44 of the bypass duct 42. The third gas shield 74 has an annulus shape and defines an inner edge 76 and an outer edge 78. The third gas shield 74 may comprise any suitable impermeable material that prevents the flow of a fluid there through. For example, the third gas shield 74 may comprise rubber, polyvinyl chloride (PVC), polyurethane (PU), silicone elastomer, or fluoropolymer.

The inner edge 76 has a diameter that is greater than the maximum diameter of the engine case 36 aft of the fan case 34 to enable the third gas shield 74 to move over the rear of the gas turbine engine 10 and into the position illustrated in FIG. 4. The inner edge 76 is arranged to couple to the engine case 36. For example, the inner edge 76 of the third gas shield 74 may be coupled to the engine case 36 via a plurality of fasteners (such as clips or pegs). By way of another example, the inner edge 76 of the third gas shield 74 may comprise an elastic annulus that provides a radially compressive force to the engine case 36.

The outer edge 78 has a diameter that is equal to or greater than the diameter of the fan case 34. The outer edge 78 is arranged to couple to the fan case 34. For example, the outer edge 78 of the third gas shield 74 may be coupled to the fan case 34 via a plurality of fasteners (such as clips or pegs). By way of another example, the outer edge 78 of the third gas shield 74 may comprise an elastic annulus that provides a radially compressive force to the fan case 34 adjacent to the outlet 44.

The third gas shield 74 may comprise a third valve 80 to control a flow of fluid through the third gas shield 74. The third valve 80 may have any suitable structure and may be located at any position in the third gas shield 74. The third valve 80 may be connected to the pump 56 and may function as an inlet for fluid into the bypass duct 42. Alternatively, the third valve 80 may function as an exhaust for fluid within the gas turbine engine 10 and may be connected to the fluid reservoir 54 to enable fluid to be recycled. Additionally or alternatively, the third valve 80 may be connected to the sensor 62 to enable the fluid to be analysed.

The gas shield arrangement 122 also differs from the gas shield arrangement 121 in that the gas shield arrangement 122 may further comprise a fourth valve 82 to control a flow of fluid through a borescope port of the gas turbine engine 10 (such as the borescope port 72). The fourth valve 82 may be connected to the pump 56 and may function as an inlet for fluid into the first gas flow path 38. Alternatively, the fourth valve 82 may function as an exhaust for fluid within the gas turbine engine 10 and may be connected to the fluid reservoir 54 to enable fluid to be recycled. Additionally, or alternatively, the fourth valve 82 may be connected to the sensor 62 to enable the fluid to be analysed. The continuum robot 64 may enter the first gas flow path 38 via the fourth valve 82 and the borescope port 72.

It should be appreciated that any one or more of the first valve 58, the second valve 60, the third valve 80 and the fourth valve 82 may be connected to the pump 56 to receive fluid from the fluid reservoir 54 and that any of the other valves may be used as an exhaust. The remaining valves may be used by the continuum robot 64 to enter the gas turbine engine 10. For example, the third valve 80 may be connected to the pump 56 to receive fluid from the fluid reservoir 54, the fourth valve 82 or the second valve 60 may be used to exhaust fluid from the gas turbine engine 10, and the first valve 58 may be used by the continuum robot 64 to enter the gas turbine engine 10 from the front to perform an action.

Figure 5:
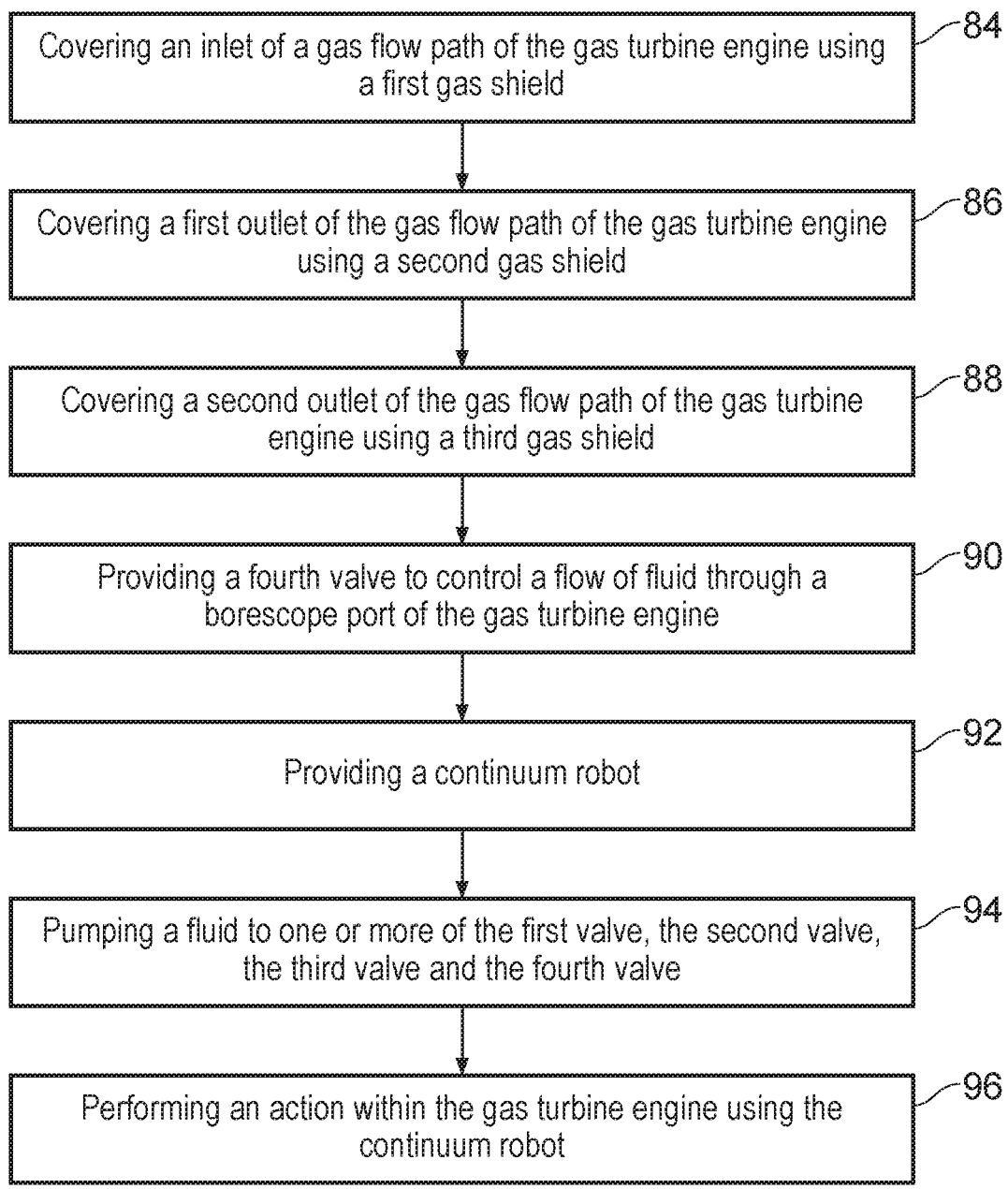
FIG. 5 illustrates a flow diagram of a method of gas shielding a gas turbine engine according to various examples.

FIG. 5 illustrates a flow diagram of a method of gas shielding an interior of a gas turbine engine 10 according to various examples.

At block 84, the method includes covering the inlet 16 of the gas flow path 38, 40 of the gas turbine engine 10 using the first gas shield 46. The first gas shield 46 may be coupled to the fan case 34 around the inlet 16 to prevent the flow of fluid between the interior of the gas turbine engine 10 and the environment via the inlet 16.

At block 86, the method may include covering the outlet 32 of the gas flow path 38 of the gas turbine engine 10 using the second gas shield 48. The second gas shield 48 may be coupled to the engine case 36 around the exhaust nozzle 32 to prevent the flow of fluid between the interior of the gas turbine engine 10 and the environment via the exhaust nozzle 32.

At block 88, the method may include covering the outlet 44 of the gas flow path 40 of the gas turbine engine 10 using the third gas shield 74. The third gas shield 74 may be coupled to the engine case 36 and to the fan case 34 to prevent the flow of fluid between the bypass duct 42 and the environment via the outlet 44.

At block 90, the method may include providing one or more fourth valves 82 to control a flow of fluid through one or more borescope ports 72 respectively.

At block 92, the method may include providing a continuum robot 64. For example, the continuum robot 64 may be inserted into the gas turbine engine 10 via the first valve 58, the second valve 60, the third valve 80 or the fourth valve 82.

At block 94, the method may include pumping a fluid to one or more of the first valve 58, the second valve 60, the third valve 80, and the fourth valve 82. For example, the pump 56 may pump an inert gas such as argon or nitrogen to the first valve 58 so that the inert gas flows through the first gas flow path 38 and the second gas flow path 40.

At block 96, the method may include performing an action within the first gas flow path 38 or the second gas flow path 40 of the gas turbine engine 10 using the continuum robot 64. For example, where the continuum robot 64 is inserted through the borescope port 72 illustrated in FIGS. 3 and 4, the continuum robot 64 may perform a repair activity (such as welding) or an inspect activity on the intermediate pressure turbine 28 or the low pressure turbine 30.

The apparatus 12, 121, 122 may provide several advantages. First, the apparatus 12, 121, 122 may enable an inspection activity or a repair activity (that benefits from, or requires, a controlled atmosphere) to be performed within the gas turbine engine 10 without the gas turbine engine 10 being disassembled. For example, the first, second and third gas shields 46, 48 and 74 may be used to cover the openings of the gas turbine engine 10 while the gas turbine engine 10 is mounted to an aircraft (for example, a wing of an aircraft) and the continuum robot 64 may then be inserted through the borescope port 72 to perform an inspection activity or a repair activity. This may significantly reduce the time and cost for performing such an activity within the gas turbine engine 10.

Second, the apparatus 12, 121, 122 may be used to assist with the cooling of one or more components of the gas turbine engine 10 subsequent to a repair activity having been performed. For example, one or more of the first valve 58, the second valve 60, the third valve 80 and the fourth valve 82 may be coupled to a reservoir of cooling fluid and the cooling fluid may then be pumped through the first gas flow path 38 and/or the second gas flow path 40 to cool a component that has recently been welded.

Third, the apparatus 12, 121, 122 may be used to assist with the removal of contamination within the gas turbine engine 10 subsequent to a repair activity having been performed. For example, one or more of the first valve 58, the second valve 60, the third valve 80 and the fourth valve 82 may be coupled to a reservoir of cleaning fluid and the cleaning fluid may then be pumped through the first gas flow path 38 and/or the second gas flow path 40 to remove contamination from the repair area.

It will be understood that the invention is not limited to the embodiments above-described and various modifications and improvements can be made without departing from the concepts described herein. For example, the apparatus 10, 121, 122 may be used to remove fluid from the gas turbine engine 10. For example, the first valve 58, the second valve 60, the third valve 80 and the fourth valve 82 may be configured to allow the egress of fluid from the gas turbine engine 10 to the environment (and prevent the ingress of fluid into the gas turbine engine 10). One or more of the first valve 58, the second valve 60, the third valve 80 and the fourth valve 82 may be connected to a vacuum pump to remove fluid from (and thereby evacuate) the interior of the gas turbine engine 10. This may be advantageous where a repair activity or an inspection activity benefits from (or requires) a vacuum.

Except where mutually exclusive, any of the features may be employed separately or in combination with any other features and the disclosure extends to and includes all combinations and sub-combinations of one or more features described herein.

The invention claimed is:

1. A gas shield arrangement for a gas turbine engine, the gas shield arrangement comprising:
    a first gas shield arranged to cover an inlet of a gas flow path of the gas turbine engine;
    a first valve configured to control a flow of fluid through the first gas shield;
    a second gas shield arranged to cover a first outlet of the gas flow path of the gas turbine engine;
    a second valve configured to control a flow of fluid through the second gas shield;
    a reservoir including one or more containers comprising one or more fluids; and
    a pump for pumping at least one of the one or more fluids from the reservoir to one of the first valve and the second valve to provide a controlled atmosphere within the gas flow path, at least some of the at least one pumped fluid returning to the reservoir from the other of the first valve and the second valve, wherein
    the at least one of the one or more fluids flows from the reservoir, through the pump, and to the first valve.

2. The gas shield arrangement as claimed in claim 1, wherein the first gas shield has a perimeter that is arranged to couple to the gas turbine engine around the inlet.

3. The gas shield arrangement as claimed in claim 1, wherein the second gas shield has a perimeter that is arranged to couple to the gas turbine engine around the first outlet.

4. The gas shield arrangement as claimed in claim 1, further comprising a third gas shield arranged to cover a second outlet of the gas flow path of the gas turbine engine.

5. The gas shield arrangement as claimed in claim 4, further comprising a third valve configured to control a flow of fluid through the third gas shield.

6. The gas shield arrangement as claimed in claim 1, further comprising a fourth valve configured to control a flow of fluid through a borescope port of the gas turbine engine.

7. An apparatus comprising:
 a gas shield arrangement as claimed in claim 1; and
 a continuum robot for performing an action within the gas turbine engine.

8. The apparatus as claimed in claim 7, wherein the action is welding a component of the gas turbine engine.

9. A method of gas shielding a gas turbine engine, the method comprising:
 covering an inlet of a gas flow path of the gas turbine engine using a first gas shield;
 covering a first outlet of the gas flow path of the gas turbine engine using a second gas shield; and
 pumping at least one fluid from, a reservoir to one of a first valve configured to control a flow of fluid through the first gas shield and a second valve configured to control a flow of fluid through the second gas shield to provide a controlled atmosphere within the gas flow path, at least some of the at least one pumped fluid returning to the reservoir from the other of the first valve and the second valve, wherein the at least one fluid flows from the reservoir, through the pump, and to the first valve.

10. The method as claimed in claim 9, wherein the first gas shield has a perimeter that is arranged to couple to the gas turbine engine around the inlet.

11. The method as claimed in claim 9, wherein the second gas shield has a perimeter that is arranged to couple to the gas turbine engine around the first outlet.

12. The method as claimed in claim 9, further comprising covering a second outlet of the gas flow path of the gas turbine engine using a third gas shield.

13. The method as claimed in claim 12, wherein the third gas shield comprises a third valve configured to control a flow of fluid through the third gas shield.

14. The method as claimed in claim 9, further comprising providing a fourth valve configured to control a flow of fluid through a borescope port of the gas turbine engine.

15. The method as claimed in claim 9, further comprising:
 providing a continuum robot; and
 performing an action within the gas turbine engine using the continuum robot.

16. The method as claimed in claim 15, wherein the action is welding a component of the gas turbine engine.

\* \* \* \* \*